(12) United States Patent
Cao et al.

(10) Patent No.: US 8,702,145 B2
(45) Date of Patent: Apr. 22, 2014

(54) CARGO COVER FOR MOVABLE SEAT

(75) Inventors: Michael Cao, Dublin, OH (US); Ross L. Burghardt, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/315,869

(22) Filed: Dec. 9, 2011

(65) Prior Publication Data

US 2013/0147226 A1 Jun. 13, 2013

(51) Int. Cl.
*B60R 11/00* (2006.01)
(52) U.S. Cl.
USPC ..................................... 296/37.16; 296/65.05
(58) Field of Classification Search
USPC ......... 296/181.3, 37.16, 64, 69, 65.01, 65.11, 296/65.13, 24.43, 26.14; 224/541, 542; 16/72
See application file for complete search history.

(56) References Cited

U.S. PATENT DOCUMENTS

| | | | | |
|---|---|---|---|---|
| 4,198,091 A | * | 4/1980 | Appleton | 296/63 |
| 4,277,097 A | * | 7/1981 | Lalanne | 296/37.16 |
| 4,351,555 A | * | 9/1982 | Hashimoto | 296/37.16 |
| 6,702,355 B1 | * | 3/2004 | Price et al. | 296/37.16 |
| 7,216,916 B2 | * | 5/2007 | Czerwinski et al. | 296/66 |
| 7,469,948 B2 | | 12/2008 | Karuppaswamy | |
| 7,934,761 B2 | * | 5/2011 | Buehl et al. | 296/37.16 |
| 8,186,736 B2 | * | 5/2012 | Jouraku | 296/37.16 |
| 2005/0279793 A1 | * | 12/2005 | Mulvihill | 224/542 |
| 2009/0115236 A1 | | 5/2009 | Sturt et al. | |
| 2010/0026031 A1 | | 2/2010 | Jouraku | |

\* cited by examiner

*Primary Examiner* — Glenn Dayoan
*Assistant Examiner* — Pinel Romain
(74) *Attorney, Agent, or Firm* — Fay Sharpe LLP

(57) ABSTRACT

A cargo area assembly for a movable seat in an automotive vehicle includes a configurable panel covering at least a portion of a storage compartment located rearwardly of the seat. The configurable panel and a removable panel cooperate to cover the storage compartment, if desired, in a full forward and full rearward position of the seat. The configurable panel incorporates hinges to allow various positioning of panel portions and storage alternatives, and the removable panel is dimensioned for storage in the tailgate.

18 Claims, 6 Drawing Sheets

CARGO COVER FOR MOVABLE SEAT

BACKGROUND

This application relates to a cargo area cover, and more particularly to a cover for a lower cargo area situated behind a movable rear seat in an automotive vehicle. However, it will be appreciated that selected aspects may find application in related cargo area cover assemblies.

Currently, automotive vehicle such as sport utility vehicles use a simple, static lid/cover to cover a rear, lower cargo area. Typically, the rear seat is a fixed mount arrangement i.e., the seat does not slide rearwardly or forwardly, but instead has a static position in the vehicle. In sport utility vehicles, as well as other automotive vehicles, there is a desire to use a movable rear seat, i.e. typically a slidable seat, that allows the vehicle owner to adjust the amount of cargo space available behind the rear seat.

Use of a static lid to cover the rear cargo area would result in an unsightly, undesired gap between the lid/cover and the cargo area in selected positions of the movable rear seat. Thus, any proposed solution would have to address a gap between the lid/cover and the seat that results from movement of the seat.

Another consideration relates to storage of the lid/cover. Oftentimes, the lid or cover is a generally rigid planar component that is selectively removed from the cover position when access is desired to the cargo area. Temporary storage of the enlarged, generally planar lid is required.

Also related to storage of the lid/cover is finding a location that does not adversely impact on receipt of items into the cargo area. For example, occasionally items stored in the cargo area are substantially larger than the volume of the cargo area and therefore the lid/cover must not interfere with receipt of large items.

Aesthetics play an increasingly important role in automotive vehicle design. Therefore, any proposed solution must be adaptable, intuitive, easy to use, and also aesthetically pleasing. Consequently, a need exists for a cargo area cover, and one particularly adaptable for a movable rear seat that meets these needs and others in an effective, reliable, easy-to-manufacture, cost-efficient, and stylish manner.

SUMMARY

A cargo area cover assembly is used with a movable seat and includes a configurable panel having a panel first portion extending adjacent a rear portion of the movable seat, and a panel second portion connected thereto that is movable between a first or storage position and a second or a cover position.

In a preferred arrangement, the cargo area cover assembly includes a panel third portion that is connected along a hinge to the panel first portion and preferably extends along a lower portion of the seat back.

The panel third portion moves with the seat back between substantially vertical and horizontal orientations.

The panel third portion includes split, independently movable first and second regions dimensioned to correspond with a corresponding split seat back.

The panel first portion is secured to the seat for movement between a seat full forward position and a seat full rearward position, while the panel second portion is dimensioned to at least partially cover the storage compartment in both a seat full forward position and a seat full rearward position.

A removable panel is dimensioned to cover at least a portion of the cargo area and configured to overlap with the panel second portion in both the seat full forward position and the seat full rearward position.

The removable panel is dimensioned for storage in a tailgate of the vehicle.

The vehicle storage compartment includes a stepped region situated behind the rear seat, and the removable panel is dimensioned so that a perimeter portion thereof extends and is supported along an upper portion of the stepped region over the lower portion of the stepped region.

The panel second portion extends rearwardly from the seat over at least a portion of the cargo area and operatively cooperates with the removable panel to eliminate any gap along the upper portion of the stepped region in both the seat full forward and seat full rearward positions.

A fastener selectively secures the panel third portion to the panel second portion.

Openings are provided in the panel first portion to accommodate seat tracks that allow the rear seat to slide forwardly and rearwardly relative to the cargo area.

A primary benefit is the ability to cover a rear cargo area behind a sliding rear seat without a gap.

Another advantage resides in the provision of a configurable panel that accommodates a split rear seat.

Yet another beneficial aspect resides in the ability to conveniently store the removable panel.

Still other benefits and advantages will become apparent to those skilled in the art upon reading and understanding the following detailed description.

DETAILED DESCRIPTION

Figure 1:
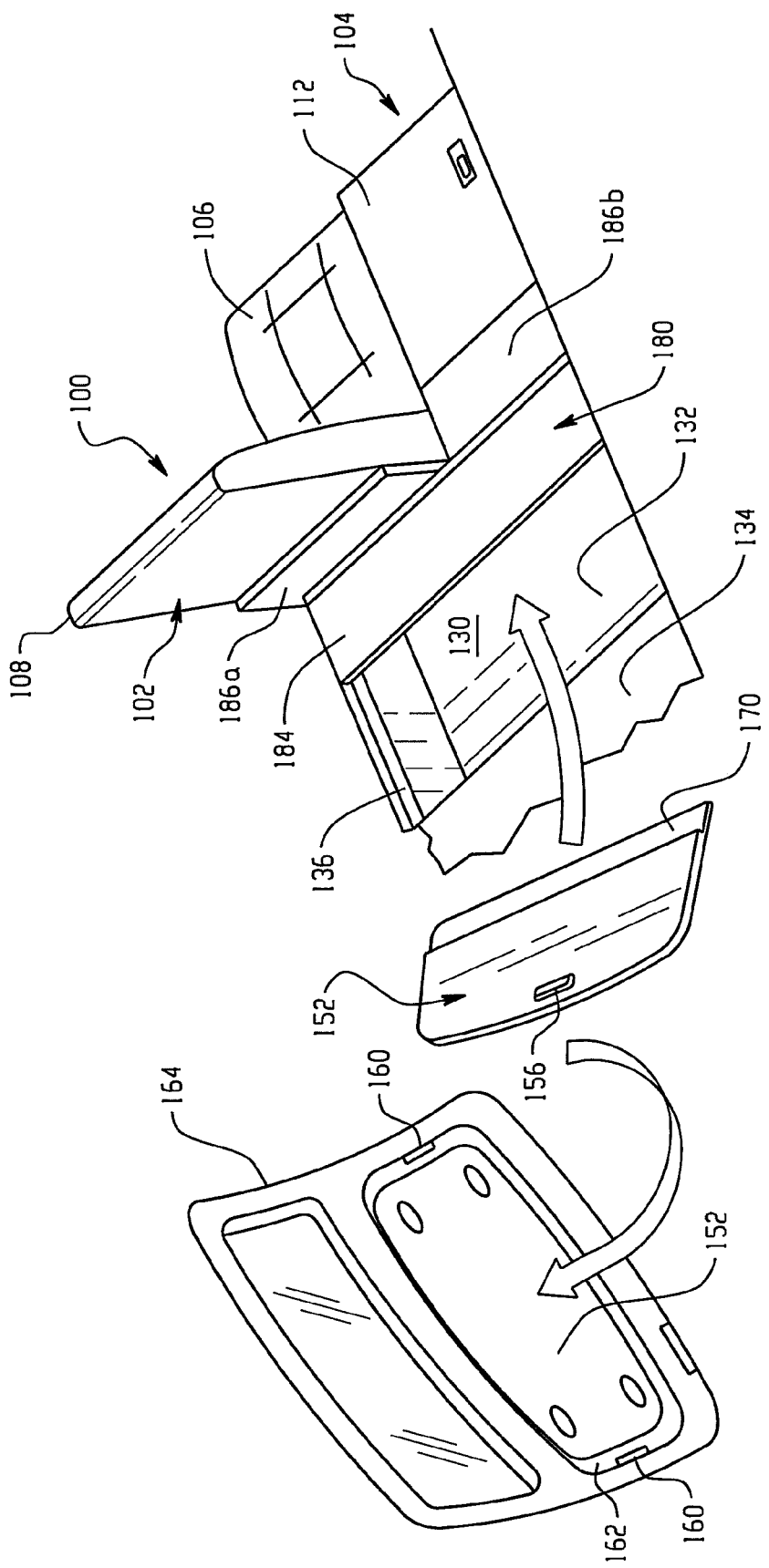
FIG. 1 is a schematic illustration of a cargo cover assembly for a movable seat.

FIG. 1 shows a portion of the interior of automotive vehicle, and particularly a seat such as movable rear seat 100 that is preferably a split seat having a first seat portion 102 and a second seat portion 104. The first seat portion 102 includes a seat member cushion or seat base 106 and a seat back 108, and likewise the second seat portion 104 includes a seat member cushion or seat base 110 and a seat back 112. Preferably each of the seat backs 108, 112 may be selectively pivoted or folded relative to the seat base 106, 110, respectively, so that one or both of the seat backs can be upright (FIGS. 2-3) or folded downwardly for increased storage capacity (FIG. 4). An associated latch or lock/release mechanism (not shown) is used to allow the vehicle owner to selectively alter the position of the seat back between the upright and storage positions.

In the illustrated embodiment, the seat 100 is secured to a floor 120 of the automotive vehicle and adapted for movement, specifically for sliding forward and rearward movement along seat track or support rail 122. Again, a suitable latch or lock/release mechanism (not shown) is provided to allow the vehicle owner to slide the seat forwardly to a full forward position (FIGS. 3 and 4) or rearwardly to a full rearward position (FIG. 2), or to intermediate positions in between, and for the seat to maintain the desired position until positively released.

A cargo area or storage compartment 130 is provided in the vehicle and in this arrangement, the cargo area is located rearwardly of the rear seat 100 and has a stepped configuration. The cargo area 130 includes a first or lower portion 132 which in this embodiment is shown at a height/depth that is the same as the floor 120 and a second or upper portion 134. A support ledge 136 is provided along the upper portion 134 and at a depth so that when the cargo area cover assembly 150 is installed, and the seat back(s) 108, 112 are folded to a storage position (FIG. 4), the seat back, cover assembly, and upper portion 134 of the cargo area are all substantially coplanar. In this manner, the overall dimension of the coplanar storage area can be maximized.

The cargo area cover assembly 150 includes a removable panel or lid 152 and a configurable panel to be described in greater detail below. The removable panel 152 is a rigid structure and dimensioned so that a perimeter portion is received on and supported by the upper portion 134 of the cargo compartment, particularly the support ledge 136. Handle 156 is provided in the removable panel 152 to assist with removing and positioning the removable panel between covering relation with the cargo area or storage compartment 132, and a tailgate storage position (FIG. 1). The removable panel may be secured with fasteners, hook and loop-type fasteners, latches, 160 etc. or received in a pocket area 162 along the inner surface of tailgate 164 so that the removable panel 152 is easily accessible and yet does not interfere with cargo received in the cargo area 130 of the vehicle.

Figure 2:
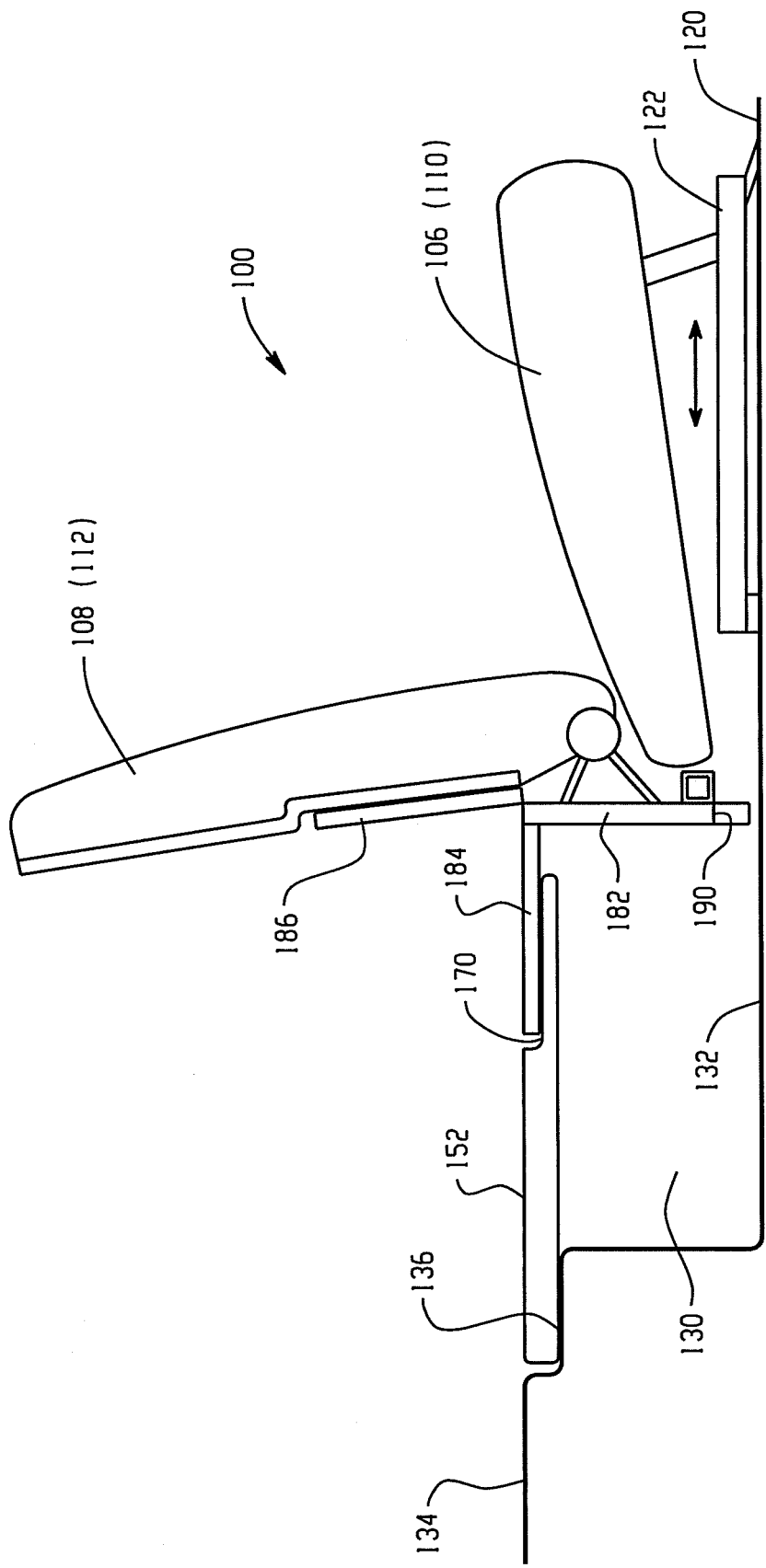
FIG. 2 is an elevational view of the cargo cover assembly of FIG. 1 with the lid/cover in place.

As is also particularly illustrated in FIGS. 1 and 2, the removable panel 152 preferably includes a recess or stepped region 170 that has a reduced cross-sectional thickness relative to the remainder of the removable panel. The recess 170 is of a depth that receives a portion of the configurable panel 180. Further, the recess 170 has an axial dimension from the perimeter edge for reasons which will be described in greater detail and become more apparent below.

The configurable panel 180 in the preferred arrangement has a generally T-shape (FIGS. 4 and 6) in one configuration and preferably includes three distinct portions referred to herein as panel first portion 182, panel second portion 184, and panel third portion 186. With continued reference to FIGS. 2-4, and additional reference to FIG. 5, the panel first portion 182 is preferably oriented in a generally vertical direction and adjacent a lower, rear portion of the seat. The panel first portion 182 includes a cutout or recess 190 for each seat track 122 on which the seat 100 is mounted for sliding movement. The cutout 190 is closely contoured to that of the seat track 122 in order to provide a movable front or vertical wall to the cargo area 130. In this way, items stored in the cargo area 130 are contained by the vertical, first panel portion 182 and do not inadvertently roll forward beneath the rear seat 100. Thus, as the seat 100 is moved forwardly and rearwardly, so, too, does the panel first portion 182 move forwardly and rearwardly with the seat.

Figure 4:
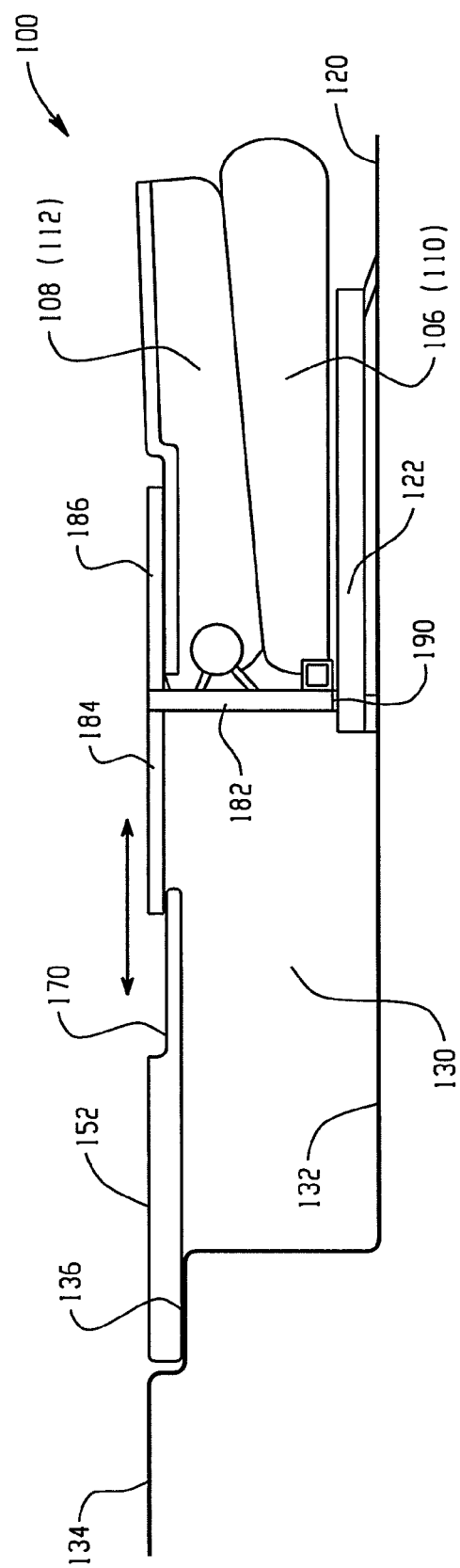
FIG. 4 is an elevational view of the cargo cover assembly in a cargo floor mode.
Figure 5:
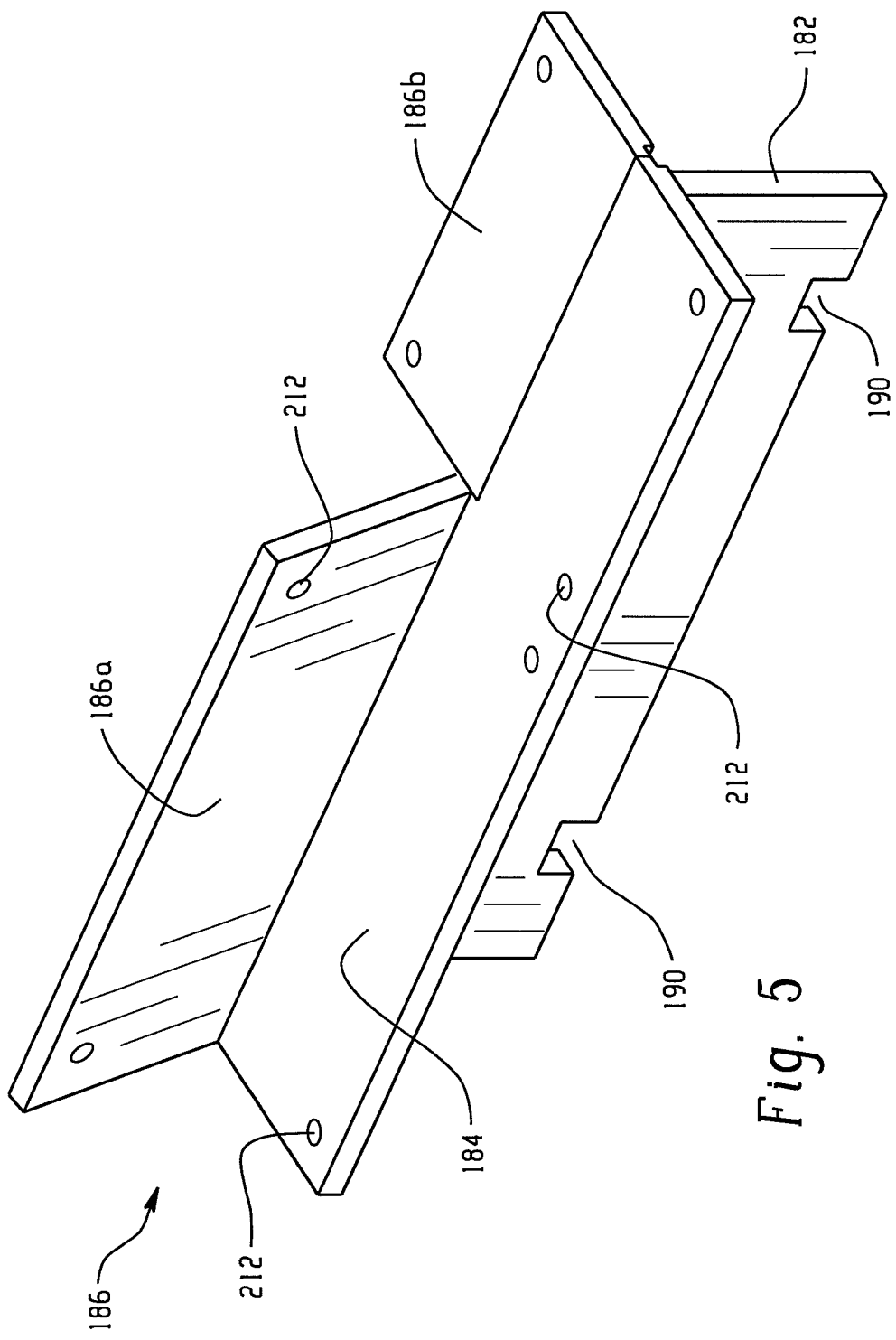
FIG. 5 is a perspective view of the cargo cover assembly and particularly illustrating the split panel portion.
Figure 6:
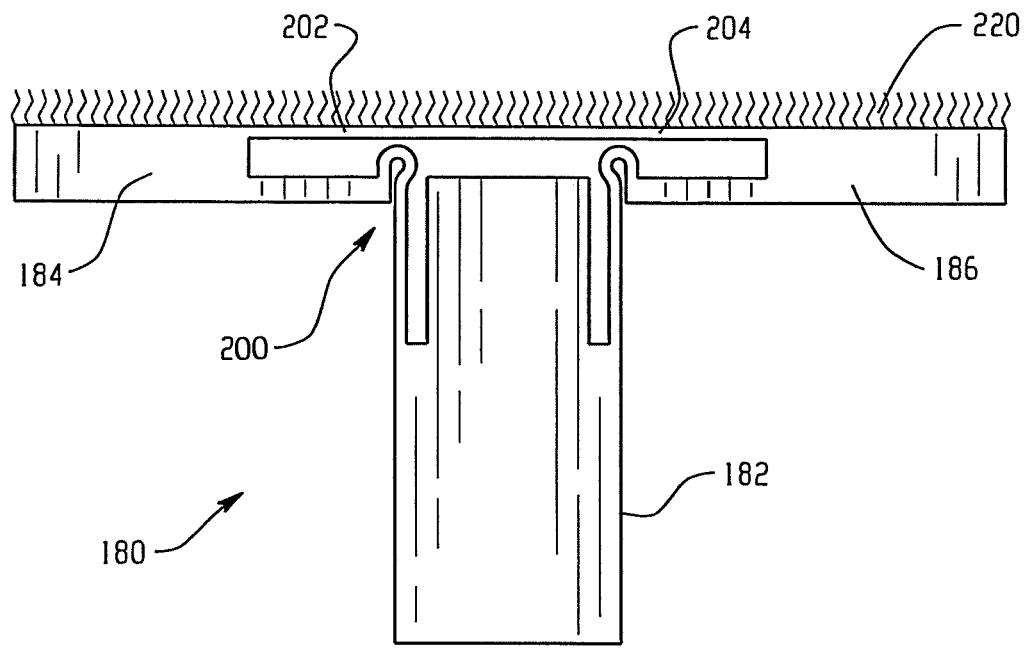
FIG. 6 is an enlarged view of the hinge section of the cargo cover assembly.
Figure 7:
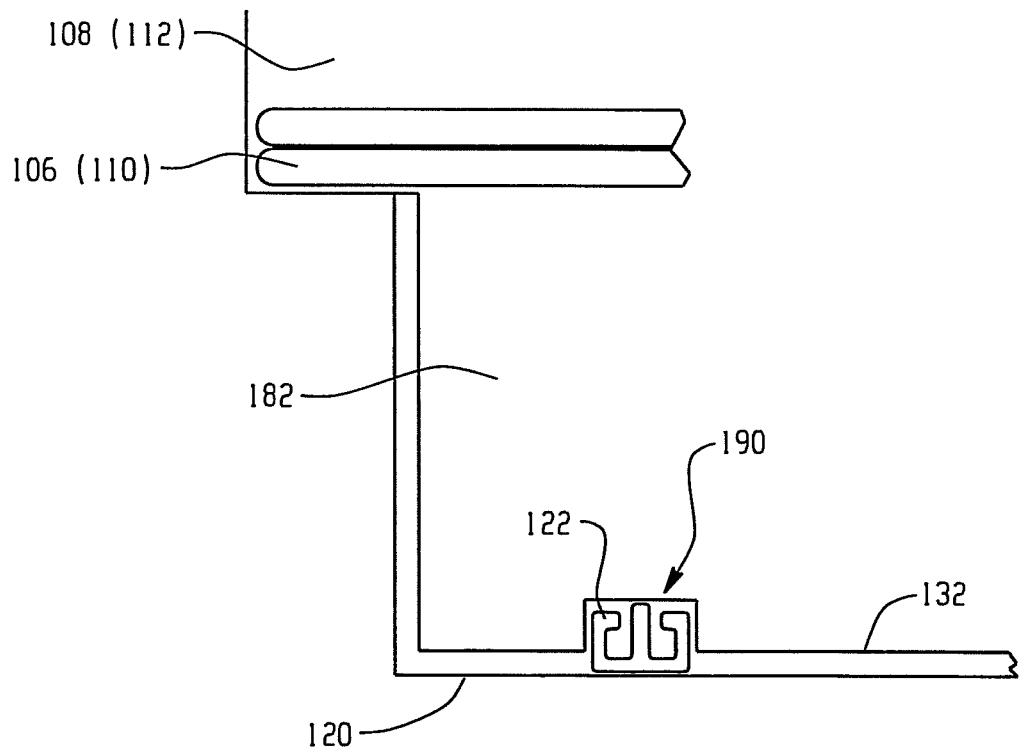
FIG. 7 is an elevational rear view of the cutout/opening provided in the cargo cover assembly to accommodate the seat track.

The panel second portion 184 and panel third portion 186 are hinged to the panel first portion 182 as represented by the various configurations of FIGS. 2-5 and more particularly illustrated by details of hinge 200 shown in FIG. 6. One preferred form of the hinge 200 is a living hinge that is formed as extruded component having reduced cross-sectional regions 202, 204 that form living hinges and allow the panel second portion 184 and panel third portion 186 to selectively pivot or hinge relative to one another, and likewise to selectively pivot relative to the panel first portion 182. As shown in FIG. 2, the panel second portion 184 adopts a generally horizontal conformation and overlaps with the recess 170 in the removable panel 152. This overlap advantageously prevents any gap because the upper surface 134, removable panel 152, and panel portion 184 are generally coplanar, while the removable panel 152 and configurable panel 180 enclose the cargo area 130 behind the rear seat. In FIG. 2, the panel third portion 186 is generally upright as the panel third portion adopts the upright orientation of the seat back 108 (112). Comparing FIGS. 1 and 2, it is evident that the split seat back allows panel third portion 186a to remain generally upright with seat back 108 while panel third portion 186b is disposed in a generally horizontal relation along with seatback 112. Of course, it will be recognized that the orientation of the seatbacks may be reversed, or the seat backs may both be upright, or both be generally horizontal, as desired.

Figure 3:
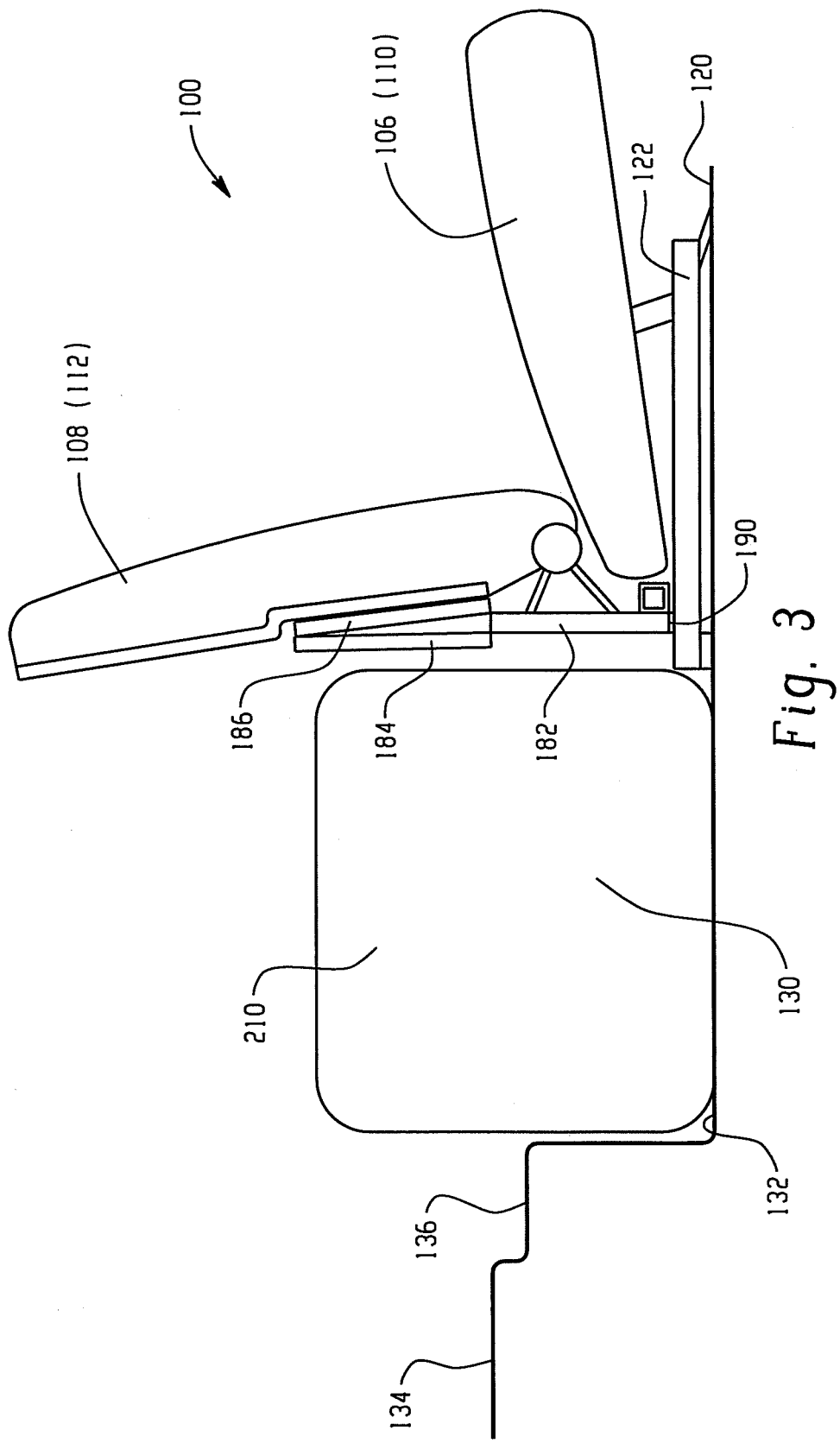
FIG. 3 is an elevational view of the cargo cover assembly accommodating a large cargo item.

In FIG. 3, the panel second portion 184 is rotated upwardly into generally flush relation with the panel third portion 186. This orientation of the configurable panel 180 allows the cargo area 132 to accommodate an enlarged cargo item 210. Fasteners, tape, latches 212, etc. (FIG. 5) may be provided on facing surfaces of the panel second portion 184 and panel third portion 186 in order to positively hold these panel portions in abutting, generally flush relation as shown in FIG. 3.

Still another position or orientation of the panel portions is shown in FIGS. 1 and 5, and also shown in FIG. 4. In this orientation of the configurable panel 180, at least one of the panel third portions 186a, 186b is disposed in a generally horizontal position when the associated seat back 108 or 112 is folded downwardly. With particular reference to FIG. 4, the seat is disposed in a full forward position along seat track 122, i.e. the panel first portion 182 is moved forwardly to maximize the volume of cargo area 130. However, the panel second portion 184 still advantageously overlaps with the recess 170 in the removable panel 152 so that there is no gap along this substantially horizontal surface formed by upper surface 134, removable panel 152, panel second portion 184, panel third portion 186, and seat back 108, 112. Again, this configurable panel provides a greater number of options to the vehicle owner and allows the owner to selectively fold seat backs downwardly or maintain them upright, move the seat forward or rearward, store the removable panel 152 in a desired storage location such as the tailgate, and/or pivot the panel second portion 184 upwardly or downwardly in order to accommodate a wide array or various types of cargo. The configurable panel 180 may also have carpet 220 or an alternative surface bonded thereto to match with the remainder of the vehicle interior and improve the aesthetics of the functional configurable panel.

The disclosure has been described with reference to the preferred embodiment. Obviously, modifications and alterations will occur to others upon reading and understanding the preceding detailed description. It is intended that the disclosure be construed as including all such modifications and alterations in so far as they come within the scope of the appended claims or the equivalents thereof.

It is now claimed:

1. A cargo area cover assembly for use with a movable seat, the cover assembly comprising:

a panel having a first portion extending adjacent a rear portion of a seat and wherein the panel first portion is secured to the seat for movement between a seat full forward position and a seat full rearward position, and a second portion connected by a hinge to one of the seat or the panel first portion for movement between a first position generally conforming to at least a portion of a seat back and a second position for at least partially covering a storage, compartment and a panel third portion that is connected along a hinge to the panel first portion and the panel third portion extends along a lower portion of the seat back.

2. The cover assembly of claim 1 wherein the panel third portion moves with the seat back.

3. The cover assembly of claim 2 wherein the panel third portion moves with the seat back between substantially vertical and horizontal orientations.

4. The cover assembly of claim 2 wherein the panel third portion moves between a first position substantially aligned with the panel first portion and a second position substantially perpendicular to the panel first portion.

5. The cover assembly of claim 1 wherein the panel third portion includes split, independently movable first and second regions dimensioned to correspond with a corresponding split seat back.

6. The cover assembly of claim 1 wherein the panel second portion in the second position is dimensioned to at least partially cover the storage compartment in a seat full forward position and a seat full rearward position.

7. The cover assembly of claim 6 further comprising a removable panel dimensioned to cover at least a portion of the storage compartment, and the removable panel is configured to overlap with the panel second portion in both the seat full forward position and the seat full rearward position.

8. The cover assembly of claim 1 further comprising a removable panel dimensioned to cover at least a portion of the storage compartment.

9. The cover assembly of claim 8 wherein the removable panel is dimensioned for storage in a tailgate of the vehicle.

10. The cover assembly of claim 1 wherein the vehicle includes a stepped region behind a seat in which a lower portion of the stepped region forms the storage compartment, and a removable panel dimensioned so that a perimeter portion thereof extends along an upper portion of the stepped region and is supported thereby over the lower portion of the stepped region.

11. The cover assembly of claim 10 wherein the panel second portion extends rearwardly from the seat over at least a portion of the storage compartment in the second position and operatively cooperates with the removable panel to eliminate any gap along the upper portion of the stepped region.

12. The cover assembly of claim 11 wherein the removable panel and the panel second portion when disposed in the second position eliminate any gap along the upper portion of the stepped region in both the seat full forward and seat full rearward positions.

13. A cargo area assembly for a movable seat in a vehicle comprising:
 a slidable seat movable between a full forward position and a full rearward position;
 a storage compartment located rearwardly of the seat;
 a configurable panel secured to a rear portion of the seat capable of covering at least a portion of the storage compartment in the full forward and full rearward positions of the seat; and
 a removable panel dimensioned to cover at least a portion of the storage compartment and operatively cooperating with the configurable panel to completely cover the storage compartment in both of the seat full forward and full rearward positions.

14. The cargo area assembly of claim 13 wherein the configurable panel includes a first portion that extends substantially perpendicularly to a rearward/forward axis of movement of the seat, a second portion movable between a storage orientation along a seat back and a cover orientation extending substantially perpendicular to the panel first portion, and a third portion secured to a seat back.

15. The cargo area assembly of claim 14 further comprising a fastener for selectively securing the panel third portion to the panel second portion.

16. The cargo area assembly of claim 14 wherein the panel third portion is split in to first and second members to allow first and second portions of a seat back to selectively pivot relative to one another.

17. The cargo area assembly of claim 14 wherein the panel first portion includes openings that accommodate rails to permit the seat and the configurable panel to slide forwardly and rearwardly relative to the storage compartment.

18. A cargo area cover assembly for use with a movable seat having a seat back, the cover assembly comprising:
 a removable panel for covering at least a portion of a storage compartment located rearwardly of the seat; and
 a configurable panel having a first portion for securing to the seat, and a second portion hingedly connected to the panel first portion for rotating between the removable panel and the seat back.

* * * * *